US008244120B2

United States Patent
Chiu

(10) Patent No.: US 8,244,120 B2
(45) Date of Patent: *Aug. 14, 2012

(54) IMAGE STABILIZER AND ANTI-VIBRATION CAMERA MODULE USING SAME

(75) Inventor: Chi-Wei Chiu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 149 days.

This patent is subject to a terminal disclaimer.

(21) Appl. No.: 12/764,971

(22) Filed: Apr. 22, 2010

(65) Prior Publication Data

US 2011/0075999 A1 Mar. 31, 2011

(30) Foreign Application Priority Data

Sep. 28, 2009 (CN) .......................... 2009 1 0307861

(51) Int. Cl.
*G03B 17/00* (2006.01)
*H04N 5/228* (2006.01)

(52) U.S. Cl. .................... 396/55; 348/208.2; 348/208.11

(58) Field of Classification Search .................... 396/55, 396/133, 427, 428; 348/169, 208.2, 208.7, 348/373, 375

See application file for complete search history.

(56) References Cited

U.S. PATENT DOCUMENTS

| | | | |
|---|---|---|---|
| 7,161,621 B2* | 1/2007 | Kai et al. | 348/208.11 |
| 7,920,780 B2* | 4/2011 | Saito | 396/55 |
| 8,040,126 B2* | 10/2011 | Matsumoto | 324/207.11 |
| 2006/0133786 A1* | 6/2006 | Teramoto | 396/55 |

* cited by examiner

*Primary Examiner* — Clayton E Laballe
*Assistant Examiner* — Leon W Rhodes, Jr.
(74) *Attorney, Agent, or Firm* — Altis Law Group, Inc.

(57) ABSTRACT

An image stabilizer includes a stationary member defining a first receiving space and a first central axis, a moveable member received in the first receiving space and spaced from the stationary member, a driving assembly including a first magnetic member fixed to the stationary member and a second magnetic member fixed to the moveable member, a resilient assembly interconnecting the stationary member and the moveable member, and a gyro. The moveable member defines a second central axis coinciding with the first central axis. The first magnetic member faces the second magnetic member. The driving assembly drives the moveable member to rotate about a first axis and a second axis relative to the stationary member through magnetic interaction between the first magnetic member and the second magnetic member. The second axis is perpendicular to the first axis; the first axis and the second axis are perpendicular to the first central axis.

20 Claims, 5 Drawing Sheets

IMAGE STABILIZER AND ANTI-VIBRATION CAMERA MODULE USING SAME

BACKGROUND

1. Technical Field

The present disclosure relates to imaging technologies and, particularly, to an image stabilizer and an anti-vibration camera module using the image stabilizer.

2. Description of Related Art

With ongoing developments in imaging and multimedia technology, camera modules have become widely used in many kinds of consumer electronic devices, such as cellular phones, laptops, digital cameras, and personal digital assistants (PDAs). Generally, a camera module includes a lens module, an image sensor such as a charge-coupled device (CCD) or a complementary metal oxide semiconductor (COMS). Light reflected by an object passes through the lens module to impinge on the image sensor. The image sensor is configured for capturing an image of the object by receiving the light.

However, image quality of these electronic devices is negatively affected when subjected to vibration from external forces. Such vibration causes deflection of the optical axis of the camera module, resulting in a blurred image being captured.

Therefore, what is needed is an image stabilizer and an anti-vibration camera module using the same which can overcome the above-mentioned problems.

DETAILED DESCRIPTION

Figure 1:
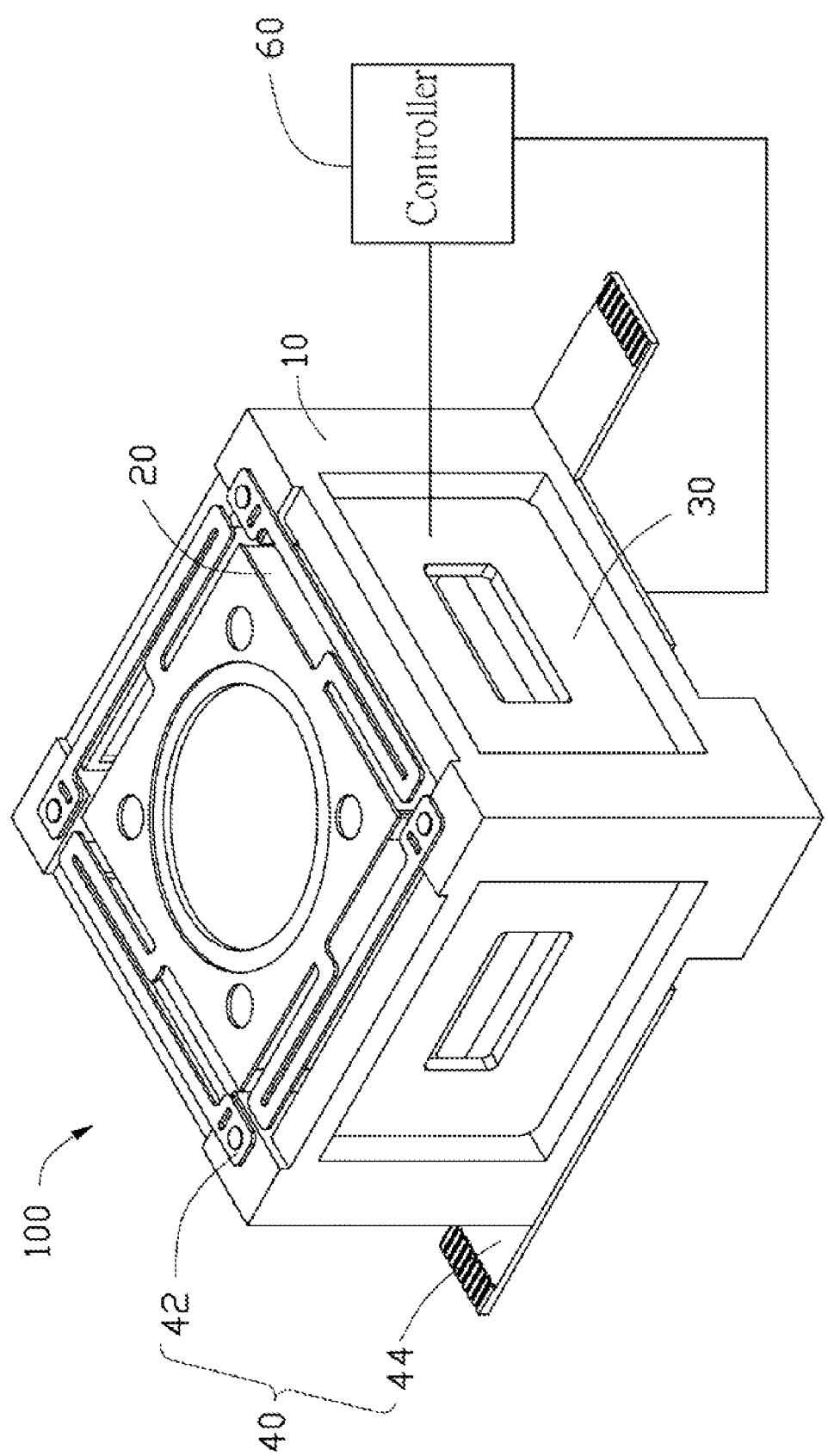
FIG. 1 is a schematic, isometric view of an image stabilizer including a stationary member, according to a first exemplary embodiment.
Figure 2:
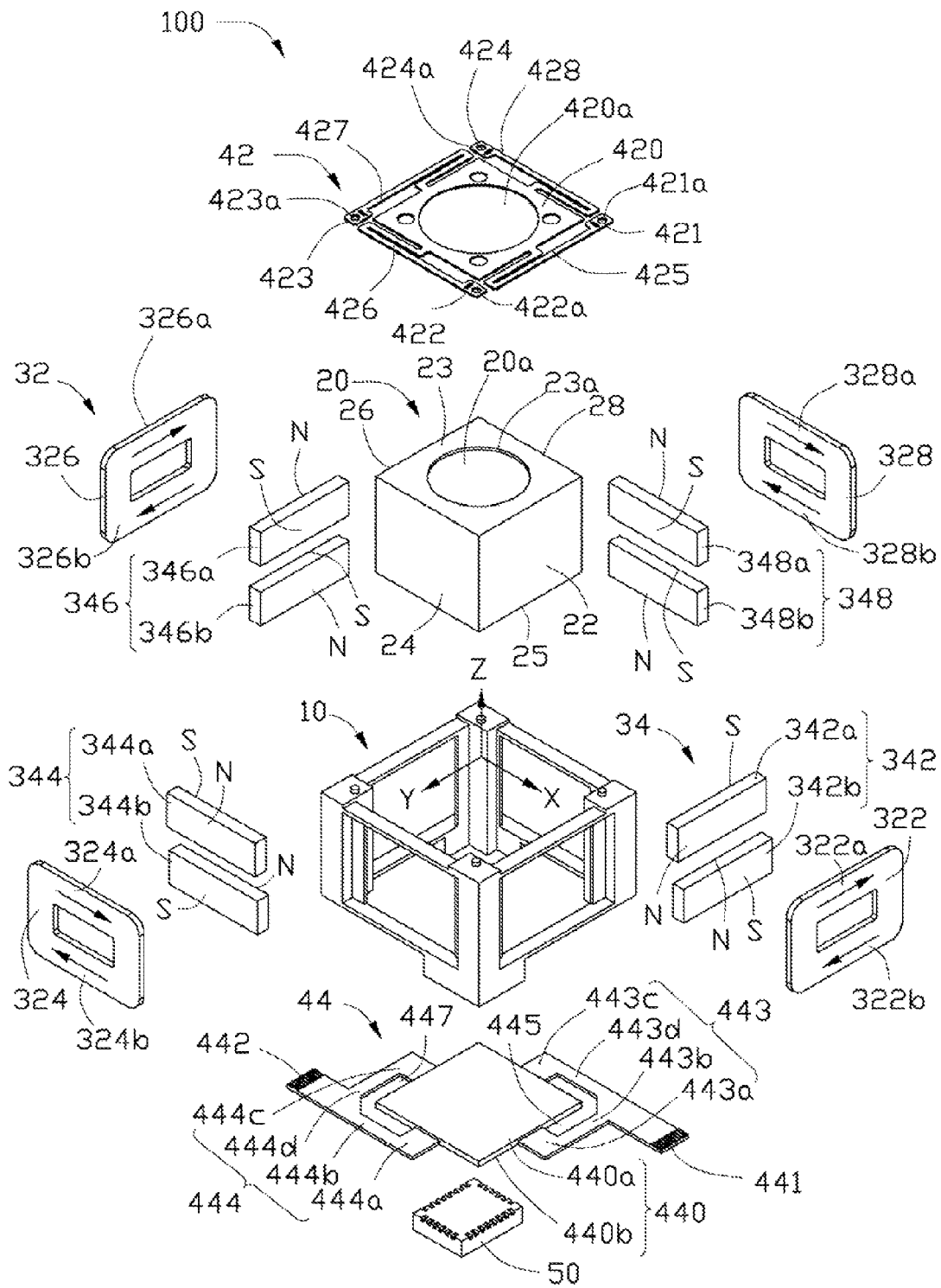
FIG. 2 is an exploded view of the image stabilizer of FIG. 1.

Referring to FIGS. 1 and 2, an image stabilizer 100, according to a first exemplary embodiment, includes a stationary member 10, a moveable member 20, a driving assembly 30, a resilient assembly 40, a gyro 50, and a controller 60.

Figure 3:
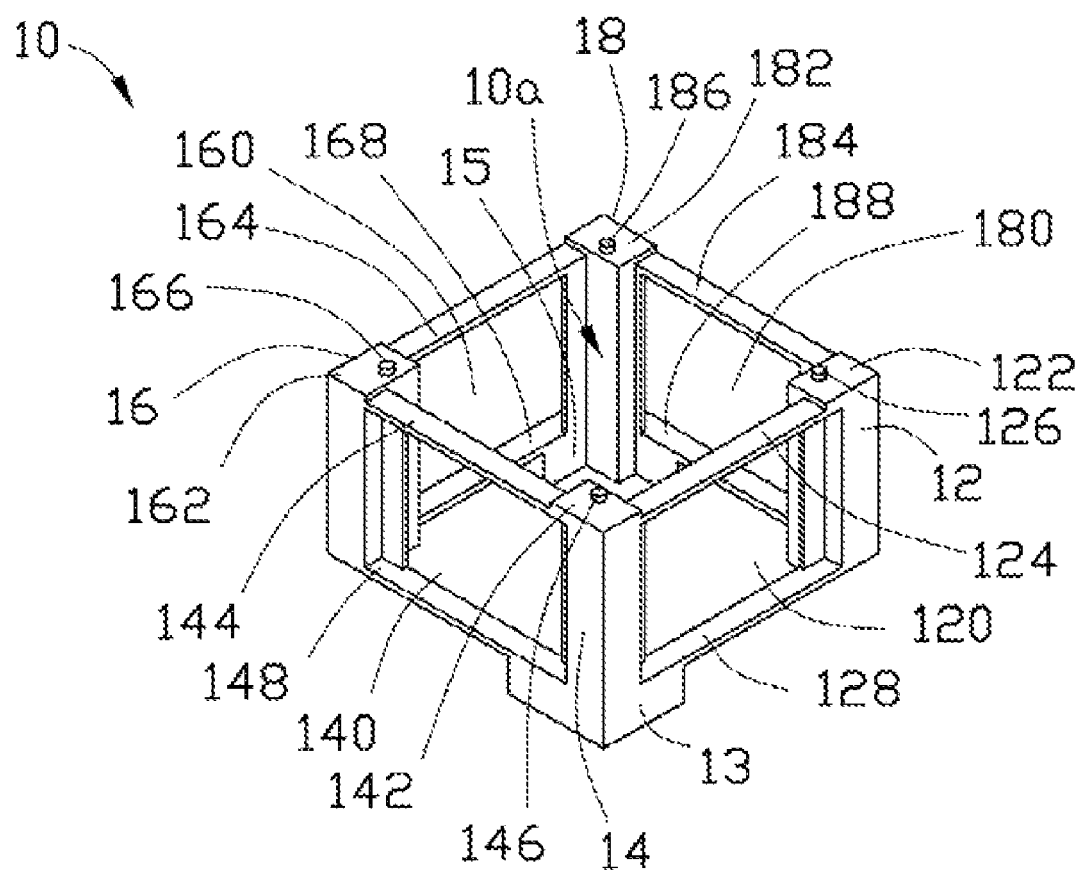
FIG. 3 is an enlarged view of the stationary member of FIG. 1.

The stationary member 10 may be fixed to an electronic device, such as a digital camera. Referring to FIG. 3, the stationary member 10 is substantially cuboid-shaped and includes a first sidewall 12, a first protrusion 13, a second sidewall 14, a second protrusion 15, a third sidewall 16, and a fourth sidewall 18. The four sidewalls 12, 14, 16, and 18 connect each other end to end correspondingly and cooperatively define a first receiving space 10*a*. A first central axis (Z axis) (shown as FIG. 2) is defined in the stationary member 10.

The first sidewall 12 defines a first receiving hole 120. The second sidewall 14 defines a second receiving hole 140. The third sidewall 16 defines a third receiving hole 160. The fourth sidewall 18 defines a fourth receiving hole 180. The four receiving holes 120, 140, 160, and 180 are in communication with the first receiving space 10*a*.

A first groove 124 is defined at a first top portion 122 of the first sidewall 12. A first post 126 is formed on the first top portion 122 outside the first groove 124. In particular, the length of the first groove 124 approximately equals to two thirds of the length of the first top portion 122. The first post 126 is positioned at an edge of the first top portion 122.

A second groove 144 is defined at a second top portion 142 of the second sidewall 14. A second post 146 is formed on the second top portion 142 outside the second groove 144. In particular, the length of the second groove 144 approximately equals to two thirds of the length of the second top portion 142. The second post 146 is positioned at an edge of the second top portion 142.

A third groove 164 is defined at a third top portion 162 of the third sidewall 16. A third post 166 is formed on the third top portion 162 outside the third groove 164. In particular, the length of the third groove 164 approximately equals to two thirds of the length of the third top portion 162. The third post 166 is positioned at an edge of the third top portion 162.

A fourth groove 184 is defined at a fourth top portion 182 of the fourth sidewall 18. A fourth post 186 is formed on the fourth top portion 182 outside the fourth groove 184. In particular, the length of the fourth groove 184 approximately equals to two thirds of the length of the fourth top portion 182. The fourth post 186 is positioned at an edge of the fourth top portion 182.

The first protrusion 13 is positioned at an intersection of the first sidewall 12 and the second sidewall 14. The first protrusion 13 extends from a first bottom portion 128 of the first sidewall 12 and a second bottom portion 148 of the second sidewall 14.

The second protrusion 15 is positioned at an intersection of the third sidewall 16 and the fourth sidewall 18. The second protrusion 15 extends from a third bottom portion 168 of the first sidewall 16 and a fourth bottom portion 188 of the fourth sidewall 18.

Referring to FIGS. 1-2, the moveable member 20 is substantially a hollow cube and has a second central axis coinciding with the first central axis (Z axis) of the stationary member 10. The moveable member 20 is moveably received in the first receiving space 10*a* and spaced from the stationary member 10.

The moveable member 20 defines a second receiving space 20*a* therein and includes a first side surface 22, a second side surface 24, a third side surface 26, a fourth side surface 28, an upper surface 23, and a lower surface 25. The four side surfaces 22, 24, 26, and 28 connect each other end to end correspondingly. The upper surface 23 and the lower surface 25 connect the four side surfaces 22, 24, 26, and 28. The upper surface 23 defines a light incident hole 23*a* in communication with the second receiving space 20*a*.

The driving assembly 30 includes a first magnetic member 32 and a second magnetic member 34. The first magnetic member 32 is fixed to the stationary member 10. The second magnetic member 34 is fixed to the moveable member 20 facing the first magnetic member 32. The driving assembly 30 is configured for driving the moveable member 20 to rotate an X axis or a Y axis relative to the stationary member 10 through interaction between the first magnetic member 32 and the second magnetic member 34. The X axis is perpendicular to the Y axis. The X axis and the Y axis are perpendicular to the Z axis.

The first magnetic member 32 includes a first coil 322, a second coil 324, a third coil 326, and a fourth coil 328. The four coils 322, 324, 326 and 328 are a rectangular ring and received in the four receiving holes 120, 140, 160, and 180, respectively. In detail, the first coil 322 is received in the first receiving hole 120 and includes a first upper side 322a and a first lower side 322b opposite to the first upper side 322a. The second coil 324 is received in the second receiving hole 140 and includes a second upper side 324a and a second lower side 324b opposite to the second upper side 324a. The third coil 326 is received in the third receiving hole 160 and includes a third upper side 326a and a third lower side 326b opposite to the third upper side 326a. The fourth coil 328 is received in the fourth receiving hole 180 and includes a fourth upper side 328a and a fourth lower side 328b opposite to the fourth upper side 328a. Electric current can be applied to the four coils 322, 324, 326 and 328 so that the four coils 322, 324, 326, and 328 generate magnetic field.

The second magnetic member 34 includes a first magnetic unit 342, a second magnetic unit 344, a third magnetic unit 346, and a fourth magnetic unit 348. The four magnetic units 342, 344, 346, and 348 are attached on the four side surfaces 22, 24, 26, and 28, respectively.

Each magnetic unit includes an upper magnet and a lower magnet. A magnetic pole of the upper magnet facing a corresponding coil is opposite to the magnetic pole of the lower magnet facing the corresponding coil. In detail, the first magnetic unit 342 includes a first upper magnet 342a and a first lower magnet 342b. The first upper magnet 342a and the first lower magnet 342b are attached on the first side surface 22 and apart from each other. The magnetic north of the first upper magnet 342a faces the first coil 322. The magnetic south of the first lower magnet 342b faces the first coil 322. The second magnetic unit 344 includes a second upper magnet 344a and a second lower magnet 344b. The second upper magnet 344a and the second lower magnet 344b are attached on the second side surface 24 and apart from each other. The magnetic north of the second upper magnet 344a faces the second coil 324. The magnetic south of the second lower magnet 344b faces the second coil 324. The third magnetic unit 346 includes a third upper magnet 346a and a third lower magnet 346b. The third upper magnet 346a and the third lower magnet 346b are attached on the third side surface 26 and apart from each other. The magnetic north of the third upper magnet 346a faces the third coil 326. The magnetic south of the third lower magnet 346b faces the third coil 326. The fourth magnetic unit 348 includes a fourth upper magnet 348a and a fourth lower magnet 348b. The fourth upper magnet 348a and the fourth lower magnet 348b are attached on the fourth side surface 28 and apart from each other. The magnetic north of the fourth upper magnet 348a faces the fourth coil 328. The magnetic south of the fourth lower magnet 348b faces the fourth coil 328.

The resilient assembly 40 interconnects the stationary member 10 and the moveable member 20. The resilient assembly 40 includes an upper resilient member 42 and a lower resilient member 44.

The upper resilient member 42 includes a moveable portion 420, a first stationary portion 421, a second stationary portion 422, a third stationary portion 423, a fourth stationary portion 424, a first deformed portion 425, a second deformed portion 426, a third deformed portion 427, and a fourth deformed portion 428. The shape of the moveable portion 420 is substantially the same as that of upper surface 23. The moveable portion 420 defines a through hole 420a having a diameter slightly greater than that of the light incident hole 20a. The through hole 420a is aligned with the light incident hole 20a. The moveable portion 420 is fixedly attached to the upper surface 23 and moves together with the moveable member 20.

A first locating hole 421a is defined in the first stationary portion 421. A second locating hole 422a is defined in the second stationary portion 422. A third locating hole 423a is defined in the third stationary portion 423. A fourth locating hole 424a is defined in the fourth stationary portion 424. The four posts 126, 146, 166, and 186 respectively engage with the four locating holes 421a, 422a, 423a, and 424a so that the four stationary portions 421, 422, 423, and 424 are fixed to the four sidewalls 12, 14, 16, and 18, respectively.

The four deformed portions 425, 426, 427, and 428 are received in the four grooves 124, 144, 164, and 184, respectively, and the space between the stationary member 10 and the moveable member 20. The four deformed portions 425, 426, 427, and 428 deform in the four grooves 124, 144, 164, and 184 and the space between the stationary member 10 and the moveable member 20.

The lower resilient member 44 is a flexible circuit board and includes a base 440, a first output portion 441, a second output portion 442, a first flexible portion 443, and a second flexible portion 444.

The shape of the base 440 is substantially the same as that of the lower surface 25. The base 440 includes a first surface 440a and a second surface 440b opposite to the first surface 440a. The first surface 440a is fixedly attached to the lower surface 25.

The first flexible portion 443 connects the first output portion 441 to the base 440. The second flexible portion 444 connects the second output portion 442 to the base 440. The two output portions 441 and 442 are configured for transmitting signals between the base 440 and electronic elements (not show) outside the image stabilizer 100.

The first flexible portion 443 includes a first connecting portion 443a, a second connecting portion 443b, a third connecting portion 443c, and a fourth connecting portion 443d. One end of the first connecting portion 443a and one end of the third connecting portion 443c are connected to two neighboring sidewalls of the base 440. The other end of the first connecting portion 443a is connected to the second connecting portion 443b. The other end of the third connecting portion 443c is connected to the fourth connecting portion 443d. The second connecting portion 443b connects the fourth connecting portion 443d. The four connecting portions 443a, 443b, 443c, and 443d and the base 440 define a first gap 445. The first gap 445 is configured for supporting a space where the first flexible portion 443 deforms. The second connecting portion 443b and the fourth connecting portion 443d are mounted to the first bottom portion 128 and the fourth bottom portion 188, respectively. The first output portion 441 extends from a junction of the second connecting portion 443b and the fourth connecting portion 443d. The first connecting portion 443a and the third connecting portion 443c are positioned at the space between the stationary member 10 and the moveable member 20.

The structure of the second flexible portion 444 is substantially same as that of the first flexible portion 443. The second flexible portion 444 includes a first connecting portion 444a, a second connecting portion 444b, a third connecting portion 444c, and a fourth connecting portion 444d. One end of the first connecting portion 444a and one end of the third connecting portion 444c are connected to two neighbor sidewalls of the base 440. The other end of the first connecting portion 444a is connected to the second connecting portion 444b. The other end of the third connecting portion 444c is connected to the fourth connecting portion 444d. The second connecting portion 444b connects the fourth connecting portion 444d. The four connecting portions 444a, 444b, 444c, and 444d and the base 440 define a second gap 447. The second gap 447 is configured for supporting a space where the second flexible portion 444 deforms. The second connecting portion 444b and the fourth connecting portion 444d are mounted to the second bottom portion 148 and the third bottom portion 168, respectively. The second output portion 442 extends from a junction of the second connecting portion 444b and the fourth connecting portion 444d. The first connecting portion 444a and the third connecting portion 444c are positioned at the space between the stationary member 10 and the moveable member 20.

The gyro 50 is assembled to the second surface 440b and configured for detecting vibration or movement of the moveable member 20 when the electronic device experiences vibration or movement. When the image stabilizer 100 is fixed in the electronic device, the two protrusions 13 and 15 cooperatively make the gyro 50 apart from other elements (not shown) in the electronic device. Therefore, the gyro 50 isn't influenced by other elements and is easily assembled.

The controller 60 is electrically connected to the gyro 50 and the four coils 322, 324, 326 and 328. The controller 60 is configured for controlling the driving assembly 30 to drive the moveable member 20 to rotate according to the detected vibration or movement of the moveable member 20.

Figure 4:
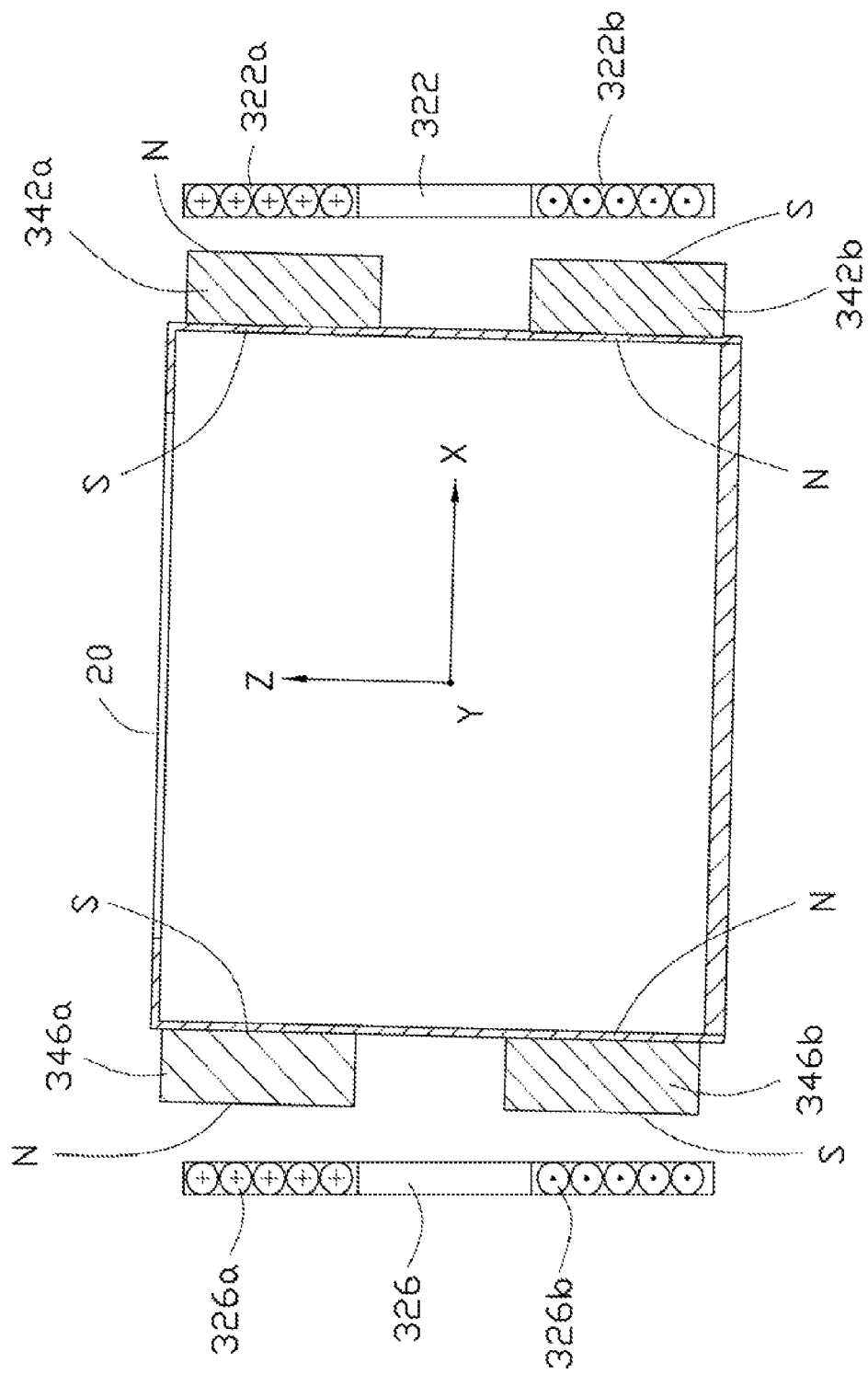
FIG. 4 is a schematic view of a working principle of the image stabilizer of FIG. 1.
Figure 5:
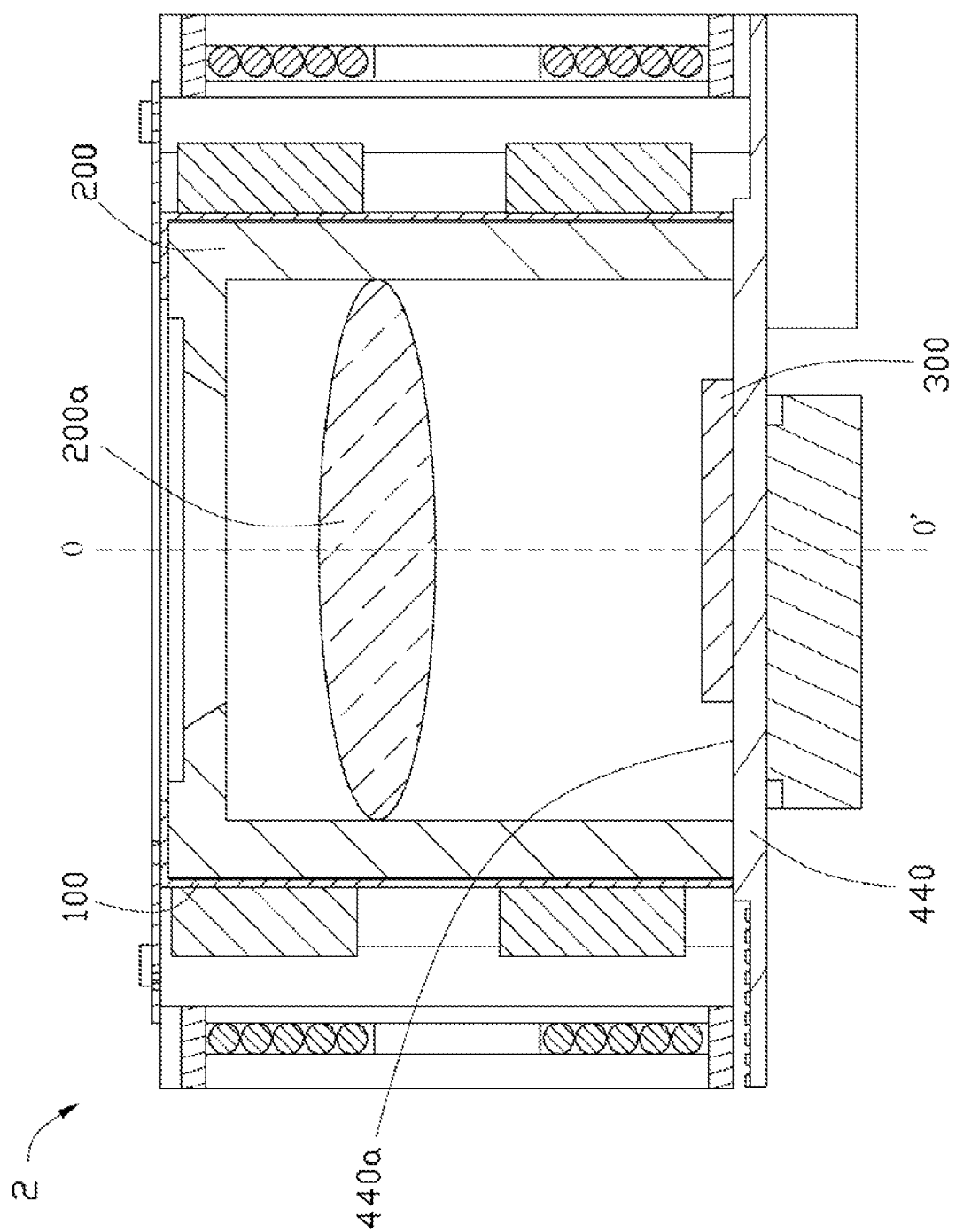
FIG. 5 is a sectional view of an anti-vibration camera module, according to a second exemplary embodiment.

Referring to FIG. 4, dots shown in the coil represents that a current in the coil goes perpendicularly away from the paper and crosses shown in the coil represents that current in the coil goes perpendicularly toward the paper. When in use, for example, currents applied to the first coil 322 and the third coil 326 are shown as ring-shaped lines with arrows in the coils 322 and 326 in FIG. 2. Therefore, the first coil 322 and the third coil 326 generate magnetic fields. Accordingly, an attractive force is applied to the first upper magnet 342a by the first upper side 322a of the first coil 322, and a repellent force is applied to the first lower magnet 342b by the first lower side 322b of the first coil 322. Similarly, a repellent force is applied to the third upper magnet 346a by the third upper side 326a of the third coil 326, and an attractive force is applied to the third lower magnet 346b by the third lower side 326b of the third coil 326. Therefore, a clockwise torque force about the Y axis is applied to the moveable member 20 and the moveable member 20 is driven to move clockwise about the Y axis. Meanwhile, the four deformed portions 425, 426, 427, and 428 are deformed, and the two flexible portions 443 and 444 are folded, because of a movement of the moveable member 20. When the currents in the coils 322 and 326 are gone, the four deformed portions 425, 426, 427, and 428 are restored to drive the moveable member 20 counterclockwise about the Y axis and the two flexible portions 443 and 444 are unfolded.

Similarly, when currents applied to the second coil 324 and the fourth coil 328 are shown as ring-shaped lines with arrows in the coils 324 and 328 in FIG. 2, the moveable member 20 is driven to rotate about the X axis by interaction between the coils 324 and 328 and the magnetic units 344 and 348. When the currents in the coils 324 and 328 are gone, the four deformed portions 425, 426, 427, and 428 are restored to drive the moveable member to an initial position.

It is to be understood that in alternative embodiments, the magnetic poles of the second magnetic member 34 may be magnetically changed, and the directions of currents applied to the first magnetic member 32 may be changed accordingly.

Referring to FIG. 4 together with FIG. 2, an anti-vibration camera module 2, according to a second exemplary embodiment, includes the image stabilizer 100, a lens module 200, and an image sensor 300.

The lens module 200 and the image sensor 300 are received in the second receiving space 20a of the moveable member 20. The lens module 200 may be an auto-focus lens module having such as an actuator to drive a lens 200a. The image sensor 300 is fixedly attached to the first surface 440a and electrically connected to the base 440. An optical axis OO' of the lens module 200 is aligned with the image sensor 300 and a center of the light incident hole 23a of the upper surface 23. When the anti-vibration camera module 2 experiences vibration or movement, the lens module 200 and the image sensor 300 together with the moveable member 20 are driven to rotate about the X and/or Y axis to compensate the vibration or movement.

It is to be understood, however, that even though numerous characteristics and advantages of the present embodiments have been set fourth in the foregoing description, together with details of the structures and functions of the embodiments. The disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An image stabilizer, comprising:
a stationary member defining a first receiving space and a first central axis;
a moveable member received in the first receiving space and spaced from the stationary member, the moveable member defining a second central axis coinciding with the first central axis;
a driving assembly comprising a first magnetic member fixed to the stationary member and a second magnetic member fixed to the moveable member, the first magnetic member facing the second magnetic member, the driving assembly configured for driving the moveable member to rotate about a first axis and a second axis relative to the stationary member through magnetic interaction between the first magnetic member and the second magnetic member, the second axis being perpendicular to the first axis, the first axis and the second axis being perpendicular to the first central axis;
a resilient assembly interconnecting the stationary member and the moveable member, comprising an upper resilient member and a lower resilient member, the moveable member positioned between the upper resilient member and the lower resilient member, the lower resilient member fixedly attached on the stationary member, the upper resilient member configured for counter-rotating the moveable member about the first axis and the second axis relative to the stationary member; and
a gyro fixed to the lower resilient member and configured for detecting vibration or movement of the moveable member.

2. The image stabilizer as claimed in claim 1, wherein four receiving holes are respectively defined in four sidewalls of the stationary member, the first magnetic member is received in the four receiving holes.

3. The image stabilizer as claimed in claim 2, wherein the moveable member comprises four outer side surfaces facing the respective sidewalls of the stationary member, the second magnetic member is positioned on the four outer side surfaces.

4. The image stabilizer as claimed in claim 3, wherein the first magnetic member comprises four coils each received in a corresponding receiving hole.

5. The image stabilizer as claimed in claim 4, wherein the second magnetic member comprises four magnetic units each positioned on a corresponding outer side surface and facing a corresponding coil.

6. The image stabilizer as claimed in claim 5, wherein each magnetic unit comprises an upper magnet and a lower magnet, a magnetic pole of the upper magnet facing a corresponding coil being opposite to a magnetic pole of the lower magnet facing the corresponding coil.

7. The image stabilizer as claimed in claim 6, wherein the upper resilient member comprises a moveable portion, four stationary portions, and four deformed portions, the moveable portion is positioned on the moveable member, each stationary portion is positioned on a corresponding sidewall of the stationary member, each deformed portions connects a corresponding stationary portion to the moveable portion.

8. The image stabilizer as claimed in claim 7, wherein the stationary member is cuboid and comprises two protrusions at two nonadjacent corners of the stationary member, the two protrusions is adjacent to the lower resilient member.

9. The image stabilizer as claimed in claim 8, wherein the lower resilient member is a flexible circuit board.

10. The image stabilizer as claimed in claim 8, wherein the lower resilient member comprises a base fixedly attached on the moveable member, two output portions, and two flexible portions fixedly attached on the stationary member, the base supports the moveable member, each flexible portions connects a corresponding output portion to the base and extends from the stationary member, the gyro is fixedly attached on the base away from the moveable member.

11. The image stabilizer as claimed in claim 10, further comprising a controller, wherein the controller is electrically connected to the gyro and the four coils, the controller is configured for controlling the driving assembly to drive the moveable member to rotate according to the detected vibration or movement of the moveable member.

12. An anti-vibration camera module, comprising:
a stationary member defining a first receiving space and a first central axis;
a moveable member received in the first receiving space and spaced from the stationary member, the moveable member defining a second central axis coinciding with the first central axis;
a driving assembly comprising a first magnetic member fixed to the stationary member and a second magnetic member fixed to the moveable member, the first magnetic member facing the second magnetic member, the driving assembly configured for driving the moveable member to rotate about a first axis and a second axis relative to the stationary member through magnetic interaction between the first magnetic member and the second magnetic member, the second axis being perpendicular to the first axis, the first axis and the second axis being perpendicular to the first central axis;
a resilient assembly interconnecting the stationary member and the moveable member, comprising an upper resilient member and a lower resilient member, the moveable member positioned between the upper resilient member and the lower resilient member, the lower resilient member fixedly attached on the stationary member, the upper resilient member configured for counter-rotating the moveable member about the first axis and the second axis relative to the stationary member;
a gyro fixed to the lower resilient member and configured for detecting vibration or movement of the moveable member;
a lens module received in the moveable member; and
an image sensor received in the moveable member and positioned at the image side of the lens module, an optical axis of the lens module aligned with the image sensor.

13. The anti-vibration camera module as claimed in claim 12, wherein the second central axis of the moveable member coincides with the optical axis of the lens module.

14. The anti-vibration camera module as claimed in claim 13, wherein four receiving holes are respectively defined in four sidewalls of the stationary member, the first magnetic member is received in the four receiving holes.

15. The anti-vibration camera module as claimed in claim 14, wherein the moveable member comprises four outer side surfaces facing the respective sidewalls of the stationary member, the second magnetic member is positioned on the four outer side surfaces.

16. The anti-vibration camera module as claimed in claim 15, wherein the first magnetic member comprises four coils each received in a corresponding receiving hole.

17. The anti-vibration camera module as claimed in claim 16, wherein the second magnetic member comprises four magnetic units each positioned on a corresponding outer side surface and facing a corresponding coil.

18. The anti-vibration camera module as claimed in claim 17, wherein each magnetic unit comprises an upper magnet and a lower magnet, a magnetic pole of the upper magnet facing a corresponding coil being opposite to a magnetic pole of the lower magnet facing the corresponding coil.

19. The anti-vibration camera module as claimed in claim 18, wherein the upper resilient member comprises a moveable portion, four stationary portions, and four deformed portions, the moveable portion is positioned on the moveable member, each stationary portion is positioned on a corresponding sidewall of the stationary member, each deformed portions connects a corresponding stationary portion to the moveable portion.

20. The anti-vibration camera module as claimed in claim 19, wherein the stationary member is cuboid and comprises two protrusions at two nonadjacent corners of the stationary member, the two protrusions is adjacent to the lower resilient member.

* * * * *